United States Patent [19]
Warren et al.

[11] Patent Number: 5,497,857
[45] Date of Patent: Mar. 12, 1996

[54] EMERGENCY BRAKE SYSTEM FOR WHEELED VEHICLES

[75] Inventors: Oscar E. Warren; Walter N. Armstrong; Bob J. Beard, all of San Antonio, Tex.

[73] Assignee: TransTech Resources, Inc., San Antonio, Tex.

[21] Appl. No.: 282,415

[22] Filed: Jul. 29, 1994

Related U.S. Application Data

[63] Continuation of Ser. No. 996,723, Dec. 24, 1992, abandoned.

[51] Int. Cl.⁶ ...................................................... B60T 1/04
[52] U.S. Cl. ................................................. 188/4 R; 188/5
[58] Field of Search .................................... 188/4 R, 5, 8, 188/32, 36, 2 R; 293/7, 109; 180/16; 410/30; 152/225 R, 226

[56] References Cited

U.S. PATENT DOCUMENTS

| | | | |
|---|---|---|---|
| 2,182,044 | 12/1939 | Ackerman | 188/4 R |
| 2,732,035 | 1/1956 | Besoyan | 188/4 R |
| 2,789,665 | 4/1957 | Wright | 188/4 R |
| 3,321,046 | 5/1967 | Cooper | 188/4 R |
| 3,625,313 | 12/1971 | Lowrie | 188/4 R |
| 4,034,961 | 7/1977 | Breen | 188/32 X |
| 4,186,823 | 2/1980 | White, Jr. | 188/32 |
| 4,781,271 | 11/1988 | Wokeck | 188/32 |
| 4,825,478 | 5/1989 | Verano | 188/4 R |
| 4,911,270 | 3/1990 | Hudson | 188/32 |
| 4,917,219 | 4/1990 | Henry | 188/32 |

FOREIGN PATENT DOCUMENTS

| | | | |
|---|---|---|---|
| 506388 | 11/1951 | Belgium | 188/4 R |
| 469247 | 2/1952 | Italy | 188/4 R |
| 606187 | 7/1960 | Italy | 188/4 R |

*Primary Examiner*—Lee Young
*Attorney, Agent, or Firm*—William Lloyd Clayborn; John M. Cone

[57] ABSTRACT

An emergency brake system for wheeled vehicles includes a deformable brake wedge for each tire on one of the vehicle's axles. The brake wedges are constructed and arranged to transfer substantially all braking forces to the vehicle through the vehicle's tires. The system also includes releasable mechanism for allowing the brake wedges to move between inoperative and operative positions and an electrically-controlled pin for retaining the brake wedges in those positions.

3 Claims, 4 Drawing Sheets

EMERGENCY BRAKE SYSTEM FOR WHEELED VEHICLES

This application is a continuation of U.S. patent application Ser. No. 07/996723 filed Dec. 24, 1992, now abandoned.

BACKGROUND OF THE INVENTION

The present invention relates to braking systems for heavy vehicles, such as trucks, buses, and tractor-trailer combinations. More particularly, the invention relates to an emergency brake system for stopping a vehicle in the event of failure of the vehicle's normal service brake system. The emergency brake system is independent of the service brake system, but may be used in conjunction with the vehicle's service brake system in an emergency to decrease the distance required to stop the vehicle and to avoid jack-knifing. The emergency brake system may also be used as a security device to prevent unauthorized movement of the vehicle.

The service brake system of a heavy vehicle, such as a truck, bus, or tractor-trailer combination, may fail for a variety of reasons. For example, failure of the hydraulic or air system that provides power for the brake system prevents activation of the vehicle's brakes. When traveling downhill, a vehicle's brakes may overheat, causing the brakes' friction material to glaze, thereby rendering the brakes useless.

When a heavy vehicle's brakes fail, it may be impossible to avoid an accident, resulting in property damage and serious personal injuries or death.

When the driver of a tractor-trailer combination attempts an emergency stop, especially on a slippery road surface, the tractor and trailer may jackknife. That is, the trailer may skid laterally relative to the tractor.

A large majority of modern trailers do not have external frames. Most prior art emergency brake systems transfer emergency braking force to the external frame of the vehicle. If such a prior art emergency brake system were installed on most modern trailers, the emergency braking force would subject the trailer to undesirable stress and possible damage.

SUMMARY OF THE INVENTION

An object of the present invention is to provide an emergency brake system for heavy vehicles, such as trucks, buses, and tractor-trailer combinations, which emergency brake system can be activated to provide braking if the vehicle's service brake system fails.

A further object of the present invention is to provide an emergency brake system that can be used in conjunction with a vehicle's service brake system to decrease the vehicle's stopping distance and to prevent jack-knifing.

A further object of the present invention is to provide an emergency brake system in which substantially all the emergency braking force is applied to the vehicle through one or more of the vehicle's wheels.

A further object of the present invention is to provide an emergency braking system which minimizes vertical movement or "hopping" of the braking tires when the emergency brake is applied.

A further object of the present invention is to provide an emergency braking system which may be used as a security device to prevent unauthorized movement of the vehicle on which it is installed.

According to the present invention, a deformable brake wedge comprises a tire-receiving surface and a road-engaging surface. The brake wedge is constructed and arranged to transfer substantially all braking forces to the vehicle through a vehicle tire.

A preferred embodiment of the invention is adapted for use on a vehicle which has dual tires mounted on each end of an axle. A separate brake wedge is provided to receive each of the four tires.

The tire-receiving surface of each brake wedge includes a rear surface portion of relatively small vertical inclination and an upper surface portion of greater vertical inclination. The upper surface portion provides a contact zone at which, in use, a forward part of a vehicle tire makes contact with the brake wedge. The vertical inclination of the upper surface portion is sufficient to substantially prevent the tire rolling over the brake wedge. The road-engaging surface extends forward of the tire contact zone a sufficient distance to substantially prevent tipping of the brake wedge by the tire.

There are two pairs of brake wedges, one pair for each set of dual tires. The brake wedges of each pair are flexibly connected together to allow the brake wedges to accommodate variations in the tires and the road surface adjacent thereto. Each pair of brake wedges is pivotally and slidably connected to one end of a brake arm, and the other end of each brake arm is pivotally attached to the vehicle, thereby providing a means for allowing the brake arms to move between an inoperative position and an operative position.

The brake arms are retained in the inoperative and operative positions by a pair of locking pins, one of which engages each brake arm. The locking pins are mechanically connected to the shaft of a pressurized fluid-actuated cylinder. To release the brake arms from the inoperative position, the vehicle driver actuates an electrical switch, which sends a signal to an electrical solenoid control circuit. The control circuit causes the solenoid to direct pressurized fluid to one end of the cylinder, which disengages the locking pins from the brake arms, allowing them to fall toward the operative position under gravity. When a position sensor determines that the brake arms are not in the inoperative position, it sends a signal to the solenoid control circuit. The control circuit then generates a signal that causes the solenoid to direct pressurized fluid to the other end of the cylinder, and the cylinder moves the locking pins toward their engaged positions. The locking pins engage the brake arms when the brake arms reach the operative position, thereby retaining the brake arms in the operative position.

BRIEF DESCRIPTION OF THE DRAWINGS

An embodiment of the invention will be described, by way of example only, with reference to the accompanying drawings, in which.

DETAILED DESCRIPTION

Figure 1:
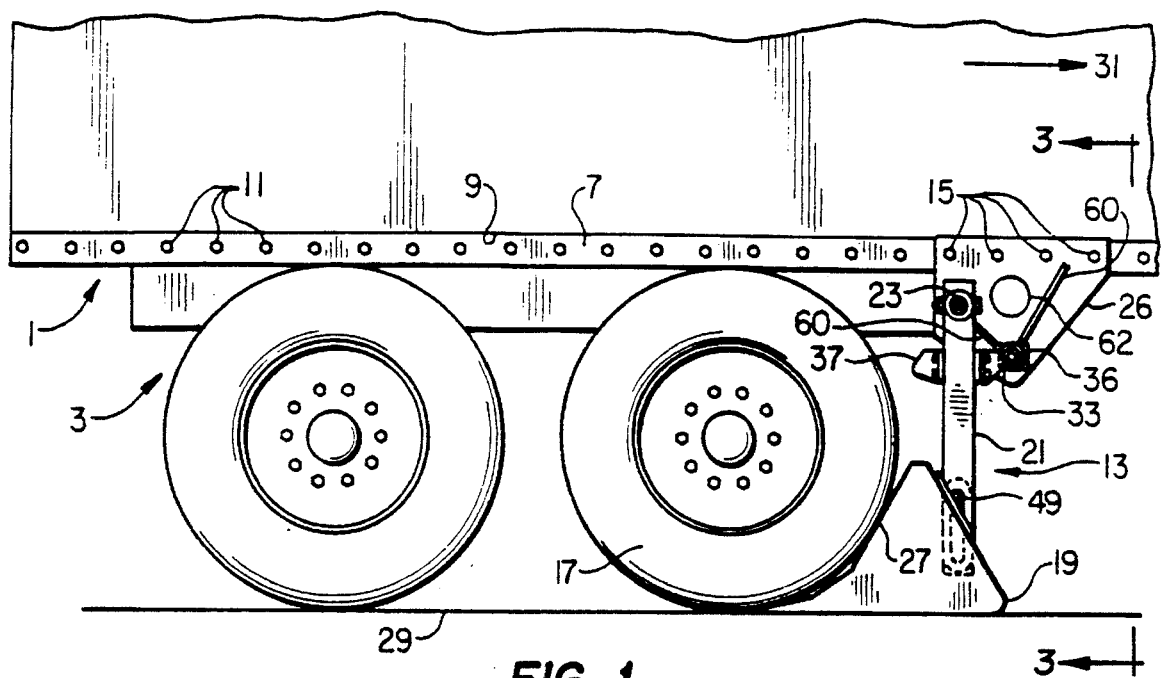
FIG. 1 is a side view of a lower rear portion of a trailer showing a preferred embodiment of the emergency brake system of the present invention in the operative position.
Figure 2:
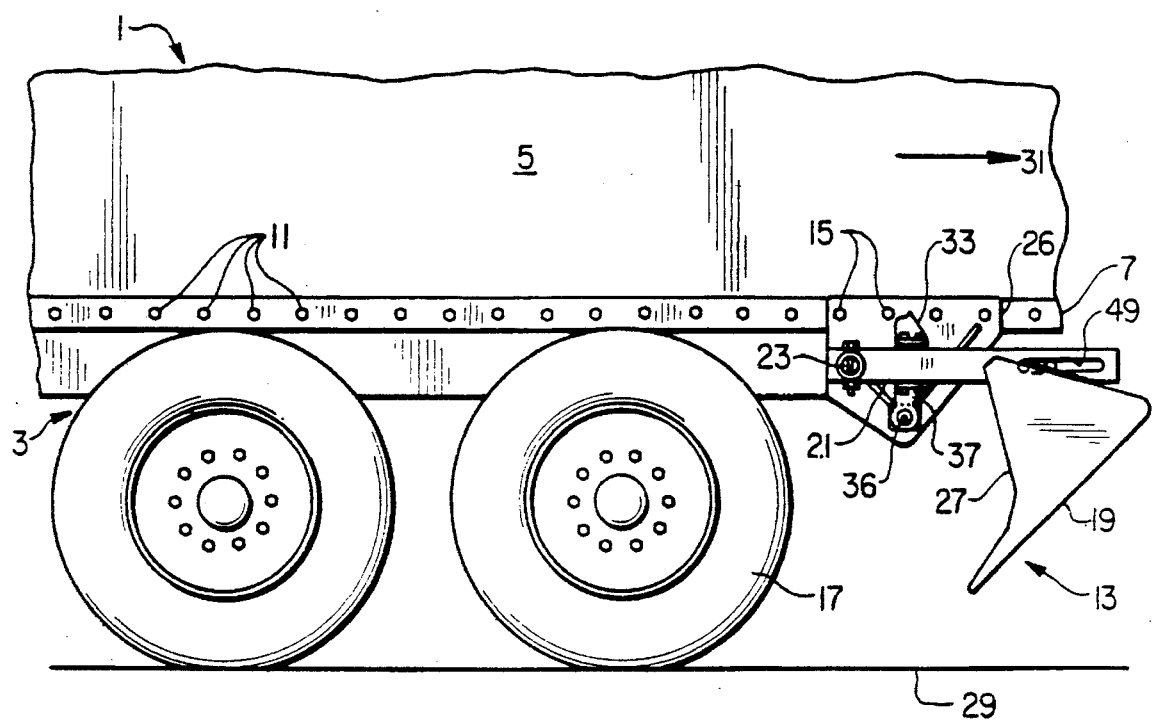
FIG. 2 is a view of FIG. 1 with the emergency brake system in the inoperative or standby position.

FIGS. 1 and 2 show the lower rear portion of a trailer 1 comprising a sliding tandem axle-wheel assembly 3 and a trailer box 5. A pair of parallel, laterally-spaced, longitudinally-extending bed rails 7 (only one of which is shown in FIGS. 1 and 2) are a part of and attached to a bottom surface 9 of the trailer box 5. The longitudinal position of the axle-wheel assembly 3 may be adjusted by moving it forward or rearward relative to the trailer box 5 and securing it to the bed rails 7 with a plurality of fasteners 11, such as nuts and bolts or pins.

While this embodiment of the invention is adapted for installation on a trailer of the type described, it is to be understood that the invention is adaptable to trailers of virtually any configuration and to other vehicles, such as buses, trucks, tanker trailers, furniture trailers, and the tractors of tractor-trailer combinations.

An emergency brake assembly 13 is also secured to the bed rails 7 by a plurality of fasteners 15, such as nuts and bolts. As described below, the emergency brake assembly 13 is moveable between an operative position, shown in FIG. 1, in which it applies braking force to the trailer's front tires 17, and an inoperative position, shown in FIG. 2, in which the tires 17 are free to rotate.

When the emergency brake assembly 13 is in an operative position, as in FIG. 1, each forward tire 17 of the trailer 1 is engaged by a corresponding brake wedge 19. As is generally the case with commercial trailers, there are four forward tires 17. Thus, the emergency brake assembly 13 includes four brake wedges 19, one for each forward tire 17, though only one brake wedge 19 (and its associated forward tire 17) is visible in FIGS. 1 and 2.

We have found that having a separate brake wedge 19 for each forward tire 17 provides superior performance over having a single brake wedge that engages both of a pair of forward tires. This is due to the ability of the separate brake wedges 19 to accommodate slight variations in conditions of the forward tires 17 and in the road surface to which each brake wedge 19 is exposed. In addition, having a separate brake wedge 19 for each forward tire 17 results in a lighter, more economical emergency brake system. Finally, having a separate brake wedge 19 for each forward tire 17 promotes proper braking if a brake wedge 19 or forward tire 17 fails during emergency braking.

On each side of the trailer 1, two brake wedges 19 are slidably attached to a brake arm 21. The brake wedges 19 are described in greater detail below. The brake arms 21 are attached to a tubular brake arm shaft 23 by a suitable means, such as a fastener or welding. The brake arm shaft 23 is mounted for axial rotation in a pair of spaced-apart brackets 25 and 26 (FIG. 3), which are attached to the bed rails 7 by the fasteners 15.

As shown in FIG. 1, when the brake assembly 13 is in the operative position, each forward tire 17 is engaged by its corresponding brake wedge 19 at a rear surface 27 of the brake wedge 19. As a result, the forward tires 17 are restrained from rotating, and the portion of the weight of the trailer 1 supported by the forward tires 17 is transferred to the corresponding brake wedges 19. Thus, the brake wedges 19 are pressed against the road surface 29, causing a braking action which restrains forward motion 31 of the trailer 1.

Figure 3:
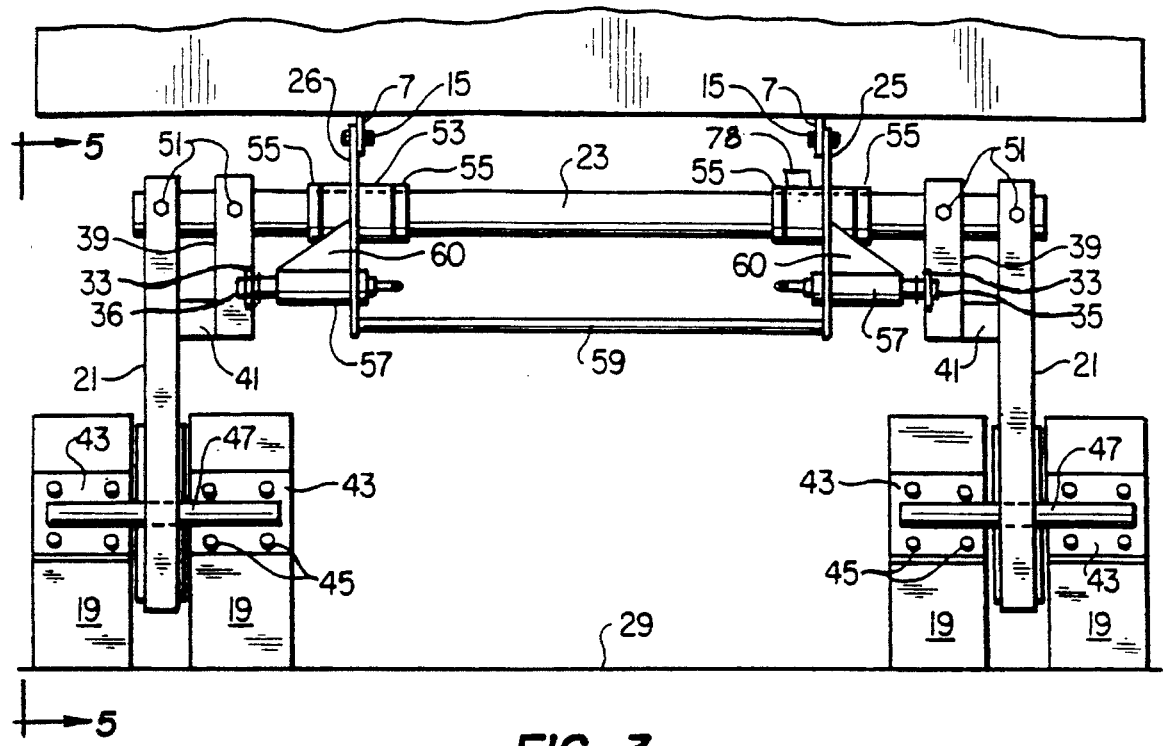
FIG. 3 is a front view of the emergency brake system of FIG. 1 taken through the plane 3—3 in FIG. 1.

Referring now to FIG. 3, each brake arm 21 is laterally supported by a secondary arm 39 and a brace 41. The brake arms 21, secondary arms 39, and braces 41 are constructed of rectangular tubing of a suitable material, such as steel, and are joined by a suitable means, such as welding.

A down striker plate 33 and an up striker plate 37 (FIGS. 1 and 2) are attached to opposite sides of each secondary arm 39 by suitable means, such as welding or fasteners. When the brake assembly 13 is in the operative position (FIG. 1), a pair of locking pins 35 and 36 engage the down striker plates 33, retaining the secondary arms 39 and, thus, the brake arms 21 in position. The secondary arms 39 and brake arms 21 are retained in the inoperative or standby position (FIG. 2) by engagement of the locking pins 35 and 36 with the up striker plates 37.

A brake wedge mounting plate 43 (FIG. 3) is attached to each brake wedge 19 by a suitable means, such as fasteners 45. A brake wedge plate bar 47 connects two brake wedge plates 43 and is slidably mounted in a slot 49 (FIG. 5) in the brake arm 21. As a result, the brake wedges 19 may move substantially vertically when the brake arms 21 are in the operative position to compensate for vertical movement of the trailer box 5 due to variations in the load carried and road irregularities. The brake wedge mounting plates 43 and brake wedge plate bars 47 are constructed of a suitable material, such as steel.

The brake arms 21 and secondary arms 39 are attached to the brake arm shaft 23 by suitable means, such as fasteners 51 or welding. The brake arm shaft 23 passes through an integral rotator shaft boss 53 on each bracket 25 and 26. Four collars 55 locate the brake arm shaft 23 laterally. The collars 55 are secured to the brake arm shaft 23 by suitable means, such as set screws (not shown). Bearings or bushings (not shown) within the rotator shaft bosses 53 allow the brake arm shaft 23 to rotate easily and dependably and absorb vibration and shock.

The locking pins 35 and 36 pass through an integral locking pin boss 57 on each bracket 25 and 26 and can be moved laterally through bushings or bearings (not shown) within the locking pin bosses 57.

A spreader bar 59 prevents lateral motion of the bottom portions of the brackets 25 and 26. In addition, gussets 60 reinforce the rotator shaft bosses 53 and the locking pin bosses 57.

Figure 4:
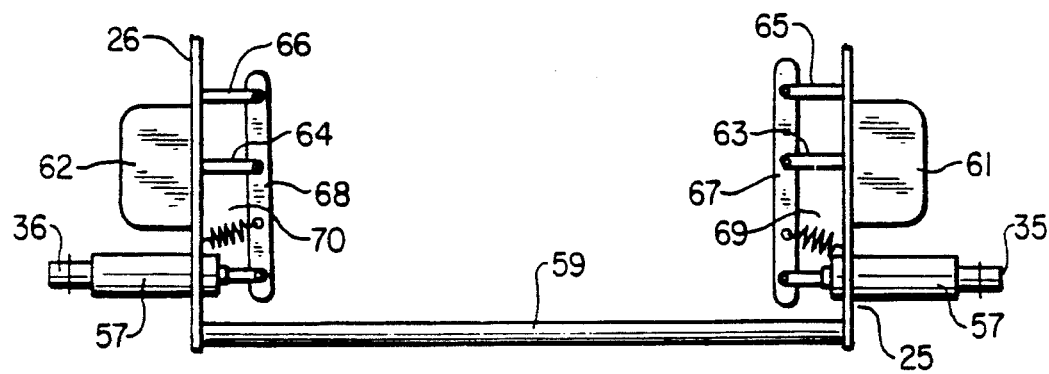
FIG. 4 is a partial plan view of the emergency brake system of FIG. 1, taken through the plane 4—4 in FIG. 3, showing only the components system for actuating the locking pin.

Referring now to FIGS. 3 and 4, a dual-action pneumatic cylinder 61 is mounted on a cylinder bracket 62 that is attached to the right bracket 25 (as viewed from the front of the trailer 1, which is the case in FIGS. 3 and 4, and which directional convention will be followed hereinafter). A shaft 63 of cylinder 61 is pivotally connected to one end of a pivoting arm 65. The pivoting arm 65 is pivotally attached to a pivot bracket 71, and the pivot bracket 71 is attached to the spreader bar 59. One end of a left locking pin rod 67 is pivotally connected to the pivoting arm 65 near the end to which the cylinder shaft 63 is connected. The other end of the left locking pin rod 67 is pivotally connected to the inner end of the left locking pin 36. The other end of the pivoting arm 65 is attached to one end of a right locking pin rod 69. The other end of the right locking pin rod 69 is pivotally connected to the inner end of the right locking pin 35.

An air reservoir (not shown), which is independent of the air supply for the service brake system, supplies pressurized air to a dual-action electrical solenoid 73. An electrically-controlled internal solenoid valve (not shown) may assume either of two positions: in one position, the solenoid 73 ports pressurized air to a first hose 75; and in the second position, the solenoid 73 ports pressurized air to the second hose 77. When the internal valve is moved to either one of the two positions, it remains in that position until electrically moved to the other position.

To pull the locking pins 35 and 36 inward, thus allowing the brake arms 21 to rotate, the driver (not shown) presses an electrical emergency brake system button (not shown) which is readily accessible when the driver is in the normal driving position. The emergency brake system button sends an electrical signal to a solenoid control circuit (not shown), which causes the solenoid 73 to port pressurized air to the first hose 75, which is connected to the inner end of the pneumatic cylinder 61. In addition, the solenoid vents the second hose 77 to the atmosphere. The pressurized air causes the pneumatic cylinder 61 to retract its shaft 63. That movement is transmitted to the locking pins 35 and 36 by the pivoting arm 65 and the locking pin rods 67 and 69.

Pulling the locking pins 35 and 36 inwardly disengages them from the up striker plates 37 (FIGS. 1 and 2), allowing the brake arms 21 to drop. As the brake arms 21 drop, they rotate the brake arm shaft 23. A sensor 78, such as a proximity switch, senses when the brake arm shaft has rotated approximately 10–15 degrees, indicating that the brake arms 21 have dropped a sufficient distance that the locking pins 35 and 36 cannot reengage the up striker plates 37. At that point, the sensor 78 sends an electrical signal to the solenoid control circuit (not shown), which causes the solenoid 73 to port pressurized air to the second hose 77, which is connected to the outer end of the pneumatic cylinder 61. The solenoid 73 also vents the first hose 75 to the atmosphere, thereby releasing the pressurized air inside the inner end of the pneumatic cylinder 61. As a result, the pneumatic cylinder 61 acts to extend its shaft 63, which movement is transmitted to the locking pins 35 and 36 by the pivot arm 65 and the locking pin rods 67 and 69. Due to interference with the inner sides of the secondary arms 39 and the down striker plates 33, the locking pins 35 and 36 do not reach the fully-extended position until the brake arms 21 are in the operative position (FIG. 1). At that time, the locking pins 35 and 36 engage the down striker plates 33, thereby locking the brake assembly 13 in its operative position.

As discussed above, the internal valve (not shown) in the pneumatic solenoid 73 remains in the last selected position until the other position is electrically selected. Thus, whenever the brake arms 21 are in the operative position (FIG. 1), the solenoid 73 ports air pressure to the left end of the pneumatic cylinder 61, which acts through the described mechanical linkage to retain the locking pins 35 and 36 in the fully-extended position, locking the brake arms 21 in the operative position. A spring 78 provides an additional means for retaining the locking pins 35 and 36 in the fully-extended position.

It will be appreciated that when the trailer 1 is parked with the brake arms 21 in the operative position, the trailer 1 cannot be moved. Thus, the emergency brake system may be used to secure the trailer 1 against unauthorized movement.

To release the brake arms 21 from the operative position, a second electrical button is pressed, sending a signal to the solenoid control circuit (not shown). Thereafter, the sequence of events is exactly the reverse of that described above, except that the brake arms 21 must be manually lifted to the inoperative position.

As best shown in FIG. 3, the brake wedges 19 of each pair of brake wedges 19 are retained in position relative to one another by the wedge mounting plates 43 and the wedge bar 47. The wedge mounting plates 43 and the wedge bar 47, in cooperation with the somewhat flexible brake wedges 19, allow the brake wedges 19 of each pair to move slightly relative to each other so as to accommodate slight variations in the forward tires 17 and in the road surface 29 to which each brake wedge 19 is exposed.

Figure 5:
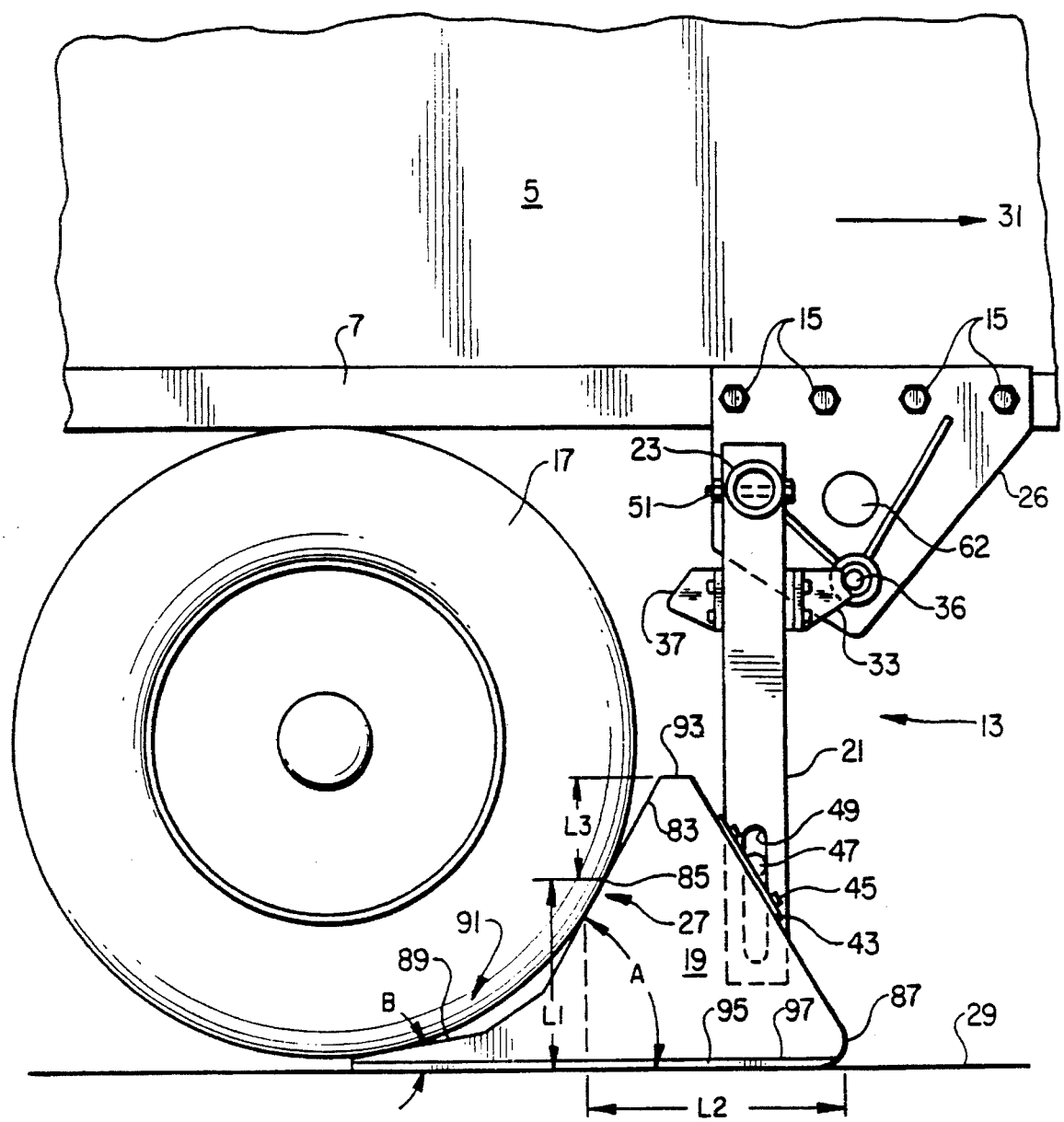
FIG. 5 is a side view of the emergency brake system of FIG. 1 taken through the plane 4—4 in FIG. 3.

As seen in FIG. 5, when the brake assembly 13 is in the operative position, each forward tire 17 engages an upper portion 83 and a lower portion 89 of the rear surface 27 of the corresponding brake wedge 19. As a result, the tire 17 is supported by the brake wedge 19 and does not contact the road surface 29.

Figure 6:
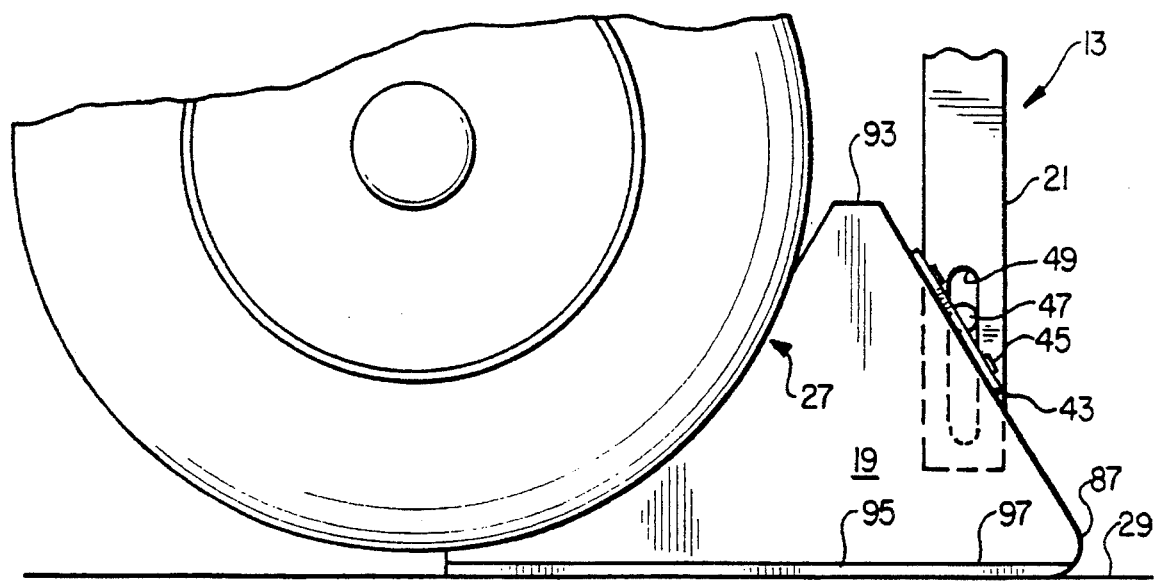
FIG. 6 is a side view of a brake wedge having a arcuate tire-receiving surface.

In this embodiment, the rear surface 27 of the brake wedge 19 is formed by three straight segments. Alternately, as shown in FIG. 6, the rear surface 27 may be an arc whose radius is approximately that of the tire 17.

Prior art emergency braking systems transfer braking forces to the vehicle through the system's structure. That requires that the system structure be relatively strong, which results in a heavy system. In addition, the vehicle area to which the braking forces are transferred must have sufficient strength to resist the forces.

An important object of the present invention is that the emergency braking forces be transferred to the trailer 1 through the trailer's suspension (not shown). This allows a relatively light weight brake assembly 13 and eliminates the possible need to reinforce the trailer 1 where the brake assembley 13 is attached. To accomplish this object, the brake wedges 19 must be configured to retain their positions relative to the tires 17 substantially without the assistance of the remainder of the brake assembly 13; i.e., the brake wedges 19 must stand on their own.

During emergency braking, the tire 17 tends to roll over the brake wedge 19. The tire 17 also tends to tip the brake wedge 19 forward. For the brake wedge 19 to stand on its own, it must be configured to resist such tire roll over and tipping.

In FIG. 5, angle A is the angle of the upper portion 83 of the rear surface 27 of the brake wedge 19 relative to the road surface 29. The resistance of the brake wedge 19 to tire roll over increases as an angle A increases. However, as angle A increases, the vertical distance L1 above the road surface 29 of the point of contact 85 between the tire 17 and the brake wedge 19 increases. As the distance L1 increases, the tire's tendency to tip the brake wedge 19 forward increases. Also, increasing the distance L1 increases the size and weight of the brake wedge 19.

The length L2 between the vertical projection of the tire contact point 85 and the nose 87 of the brake wedge also affects the wedge's resistance to tipping. As length L2 increases, the wedge's resistance to tipping increases. However, increasing the length L2 increases the size and weight of the wedge.

We have found that if the nose 87 of the brake wedge 19 is rounded, the resistance of the brake wedge 19 to tipping is increased. If a brake wedge 19 begins to tip forward, a sharp nose 87 provides a high-friction area which acts as a pivot point, which exacerbates the tipping situation.

Thus, it will be appreciated that the profile of the brake wedge 19 is a compromise between tire roll over resistance, tipping resistance, and the size and weight of the brake wedge 19.

When the tire 17 first engages the brake wedge 19, the tire 17 continues to rotate for a brief period of time (the "transition period"), until friction between the tire 17 and the rear surface 27 of the brake wedge 19 dissipates the tire's rotational momentum. As a result of the frictional reaction between the tire 17 and the brake wedge 19, the forces which cause tire roll over and brake wedge tipping are greatest during the transition period. The vertical force developed during the transition period can be quite significant, resulting in the tire moving vertically or "hopping". Indeed, under certain conditions early configurations of the brake wedge 19 caused the tire 17 to lose contact with the brake wedge 19.

The angle B of the lower portion 89 of the inner surface 27 of the brake wedge 19 relative to the road surface 29 also affects the tire's tendency to hop during the transition period. Increasing the angle B increases the vertical acceleration imparted to the tire 17 as it rolls onto the brake wedge 27, which increases hopping. Thus, to minimize its affect on hopping, angle B should be small. However, the strength of the rear end 91 of the brake wedge 19 is also related to the angle B. Increasing angle B increases the strength of the rear end 91 of the brake wedge 19, which must be sufficiently strong to resist internal bending loads. Thus, a compromise must be made between minimizing the angle B to decrease hopping and providing sufficient strength at the rear end 91 of the brake wedge 19.

We have found that constructing the brake wedges 19 of a slightly deformable material, rather than metal or similar material, decreases hopping. In deforming, a brake wedge 19 absorbs energy, which reduces the energy available to accelerate the tire 17 vertically. For that reason, the brake wedges 19 of this embodiment are constructed of a semi-rigid, skinned polyurethane foam. Other suitable materials, such as solid elastomers, that are sufficiently deformable to absorb a substantial portion of the tire's rotational energy, while being sufficiently rigid to provide the necessary support for the tire 17, can be used. Also, the rear surfaces 27 of the brake wedges 19 are smooth, which minimizes their coefficient of friction, thus decreasing the rate at which the tire 17 is decelerated, which decreases hopping.

While a slightly deformable brake wedge 19 decrease hopping, it does not eliminate it. Therefore, the vertical distance L3 between the tire contact point 85 and the top 93 of the brake wedge 19 must be sufficient to prevent the possibility of the tire 17 hopping onto the top 93 of the brake wedge 19, then rolling over it.

As stated above, the brake wedges 19 of this embodiment are constructed of a semi-rigid, skinned polyurethane foam. The diameter of the tires is 42 inches. The brake wedges' specifications in this preferred embodiment of the invention are as follows:

Angle A: 60 degrees;

Angle B: 8 degrees;

Length: 34 inches;

Height: 18.5 inches;

Width: 8 inches; and

Radius of nose: 1.5 inches.

A person skilled in the art will appreciate that variations of the dimensions can be made while still observing the performance parameters discussed above.

Figure 7:
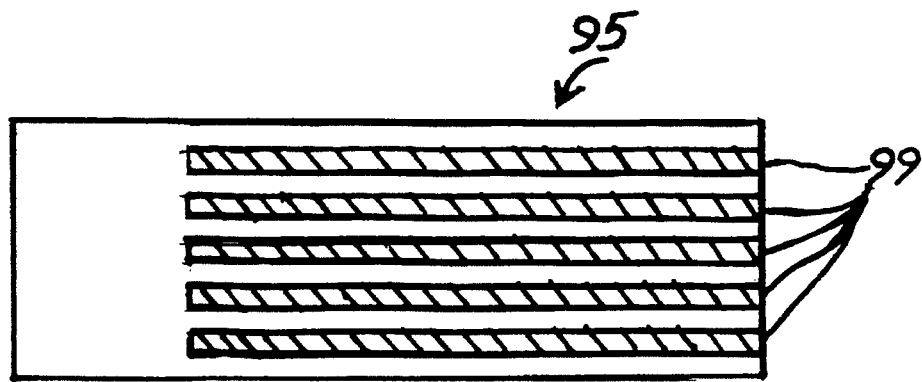
FIG. 7 is a bottom view of the brake wedge friction pad.

To increase the braking force of the wheel-brake wedge combination, a friction pad 95 (shown with an exaggerated vertical dimension) is attached to the bottom surface 97 of each brake wedge 19. We have found that if the friction coefficient of the rear portion of the friction pad 95 is greater than that of the forward portion, the tendency of the brake wedge 19 to tip forward during emergency braking is minimized. In this embodiment, as shown in FIG. 7, the friction pads 95 are constructed of polyurethane, and the rear approximately 75 percent of each friction pad 95 has rubber strips 99 disposed therein, thereby yielding a rear frictional surface that is approximately 60 percent rubber and 40 percent polyurethane, while the front portion's frictional surface is 100 percent polyurethane.

In operation, the brake assembly 13 is retained in the inoperative or standby position, as shown in FIG. 2. Upon failure of the trailer's normal brake system, or in an emergency situation which requires braking in addition to that provided by the trailer's service braking system, the driver (not shown) activates the emergency brake system by pressing the electrical button (not shown). Air pressure is then ported to the inner end of the pneumatic cylinder 61, which acts through a mechanical linkage to pull the locking pins 35 and 36 inward, releasing the brake arms 21. Due to gravity, the arms 21 rotate downward and rearward about the brake arm shaft 23. After the brake arm shaft has rotated 10–15 degrees, air pressure is ported to the outer end of the pneumatic cylinder 61, which acts to push the locking pins 35 and 36 outward. When the brake wedges 19 contact the road surface 29, friction causes the brake wedges to continue moving rearward until they come into contact with the trailer's forward tires 17. Friction between the forward tires 17 and the brake wedges 19 complete placing the brake wedges in the operative position, at which time the locking pins 35 and 36 engage the down striker plates 33, preventing the brake wedges 19 from moving out of the operative position.

As the brake arms 21 are rigidly connected to the brake arm shaft 23, the brake wedges 19 simultaneously engage the forward tires 17 on both sides of the trailer 1. This results in substantially equal braking force on both sides of the trailer 1, ensuring a straight, safe emergency,stop.

The described embodiment of the invention includes a brake wedge 19 for each forward tire 17 of a tandem-axle trailer 1. An alternate embodiment (not shown) includes a pair of brake wedges, each brake wedge being wide enough to engage a pair of tires. In addition, we have found that the invention will function acceptably if emergency braking is applied on only one side of the vehicle, although the stopping distance increases with such a system.

It is to be understood that although the term "tire" is used herein, the invention is not limited to vehicles having tires mounted on their wheels, but can be adapted to operate on vehicles with solid wheels which make direct contact with the road surface. Therefore, as used herein, the term "tire" is intended to include the term "wheel". In like manner, the term "road surface" as used herein, is intended to include any surface upon which a wheeled vehicle can travel.

While the preferred embodiment of the invention has been shown and described, it will be apparent to those skilled in this art that various modifications may be made to this embodiment without departing from the spirit of the present invention. For that reason, the scope of the invention is set forth in the following claims.

We claim:

1. An emergency brake system for a wheeled vehicle comprising:

a deformable brake wedge comprising a tire-receiving surface and a road-engaging surface, said road-engaging surface being provided by a friction pad attached to said brake wedge;

a rear portion of said friction pad having a higher coefficient of friction than that of a forward portion thereof, the forward 20–50 percent of said friction pad being constructed of polyurethane and the rear 50–80 percent being constructed of polyurethane having rubber strips disposed therein, said rubber strips constituting about 40–70 percent of the area of the rear portion of said friction pad;

said brake wedge constructed and arranged to transfer substantially all force generated by said brake wedge during emergency braking from said brake wedge to the vehicle through a vehicle tire contacting said tire-receiving surface; and said brake wedge being sufficiently deformable to limit vertical motion of said tire to retain said tire in frictional engagement with said tire-receiving surface during emergency braking.

2. An emergency brake system for a wheeled vehicle comprising:

a deformable brake wedge comprising a tire-receiving surface and a road-engaging surface;

said brake wedge constructed and arranged to transfer substantially all force generated by said brake wedge during emergency braking from said brake wedge to the vehicle through a vehicle tire contacting said tire-receiving surface;

said brake wedge being sufficiently deformable to limit vertical motion of said tire to retain said tire in frictional engagement with said tire-receiving surface during emergency braking;

releasable means for allowing said brake wedge to move between an inoperative position and an operative position, said releasable means comprising;

a brake arm having a first end and a second end;

the first end of the brake arm being pivotally connected to the vehicle;

said brake wedge being pivotally and slidably connected to the second end of the brake arm; and means for retaining the brake arm in the inoperative and operative positions, which retaining means may be actuated by a vehicle driver to allow the brake arm to move from the inoperative position, said retaining means comprising:

a locking pin for retaining the brake arm in the inoperative position or the operative position;

a pressurized fluid-actuated cylinder mechanically connected to the locking pin for moving the locking pin into and out of engagement with the brake arm;

a electrical solenoid for controlling the flow of a pressurized fluid to the cylinder;

electrical position-sensing means for determining if the brake arm is in the inoperative position;

electrical switch means readily accessible to a person who is driving the vehicle; and electrical control means for accepting signals from the brake arm position-determining means and the electrical switch means and generating a signal for controlling the solenoid;

whereby, when the driver actuates the electrical switch means, the control means generates a signal which causes the solenoid to direct pressurized fluid to one end of the cylinder, causing the cylinder to move the locking pin to a disengaged position, thereby releasing the brake arm from the inoperative position; when the position-sensing means determines that the brake arm is not in the inoperative position, the control means generates a signal which causes the solenoid to direct pressurized fluid to a second end of the cylinder, causing the locking pin to move toward an engaged position, which movement is completed when the brake arm is in the operative position.

3. An emergency brake system for a wheeled vehicle having dual tires mounted on each end of an axle, there being a total of four tires mounted thereon, said system comprising:

a separate deformable brake wedge for receiving each of said tires, said brake wedges each comprising a tire-receiving surface and a road-engaging surface, said brake wedges being constructed and arranged to transfer substantially all force generated by said brake wedges during emergency braking from said brake wedges to the vehicle through said tires, and said brake wedges being sufficiently deformable to limit vertical motion of said tires to retain said tires in frictional engagement with said tire-receiving surfaces during emergency braking;

there being two pairs of brake wedges, one pair for the dual tires on a first end of the axle and another pair for the dual tires on a second end of the axle;

a brake wedge plate flexibly attached to each brake wedge, the brake wedge plates of each pair of brake wedges being connected by a brake wedge plate bar, there being a brake wedge plate bar for each pair of brake wedges;

the brake wedge plate bar for each pair of brake wedges being disposed within a slot in one end of a brake arm, there being a brake arm for each brake wedge pair, thereby pivotally and slidably connecting the brake wedge pair to the brake arm;

a second end of each brake arm being pivotally attached to the vehicle, thereby allowing the brake wedges to move between an inoperative position and an operative position; and releasable means for retaining the brake arms in the inoperative and operative positions, said retaining means comprising electrical switch means readily available to a person who is driving the vehicle;

a locking pin for engaging each brake arm;

means for moving the locking pins into and out of engagement with the brake arms, said moving means being actuated by pressurized fluid; and electrical control means for controlling said moving means, which means is electrically connected to said switch means.

* * * * *